(12) United States Patent
Sim

(10) Patent No.: US 6,912,296 B2
(45) Date of Patent: Jun. 28, 2005

(54) MOTION ESTIMATION METHOD

(75) Inventor: Woo-sung Sim, Kyungki-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 681 days.

(21) Appl. No.: 09/783,330

(22) Filed: Feb. 15, 2001

(65) Prior Publication Data

US 2002/0034318 A1 Mar. 21, 2002

Related U.S. Application Data

(60) Provisional application No. 60/221,553, filed on Jul. 28, 2000.

(30) Foreign Application Priority Data

Sep. 25, 2000 (KR) .................. 10-2000-0056150

(51) Int. Cl.[7] ............................ G06K 9/00; H04N 7/12; H04N 5/14; H04N 11/02; H04N 11/04
(52) U.S. Cl. .................... 382/107; 348/416.1; 348/699; 375/240.16; 375/240.17
(58) Field of Search ......................... 382/107; 348/699, 348/416, 416.1; 375/240.16, 240.17

(56) References Cited

U.S. PATENT DOCUMENTS

| 6,014,181 | A | * | 1/2000 | Sun .......................... 348/699 |
| 6,332,002 | B1 | * | 12/2001 | Lim et al. ............... 375/240.17 |
| 6,363,117 | B1 | * | 3/2002 | Kok ....................... 375/240.24 |
| 6,584,212 | B1 | * | 6/2003 | Park et al. .................. 382/107 |
| 6,690,728 | B1 | * | 2/2004 | Chang et al. .......... 375/240.16 |

FOREIGN PATENT DOCUMENTS

| JP | 5-95544 A | 4/1993 |
| JP | 5-336512 A | 12/1993 |
| JP | 10-341441 A | 12/1998 |

OTHER PUBLICATIONS

Jong–Nam Kim; Tae–Sun Choi; A fast three–step search algorithm with minimum checking points using unimodal error surface assumption. Consumer Electronics, IEEE Transactions on, vol.: 44, Issue: 3, Aug. 1998, pp.: 638–648.*

Po L–M et al; "Express Letters a Novel Four–Step Search Algorithm for Fast Block Motion Estimation"; IEEE Transactions on Circuits and Systems for Video Technology, IEEE Inc. New York, US; vol. 6, No. 3, Jun. 1, 1996; pp. 313–316; XP000592426.

Koga T. et al.; "Motion–Compensated Interframe Coding for Video Conferencing" national Telecommunications Conference; (N.T.C.) New Orleans, Nov. 29–Dec. 3, 1981; New York; IEEE; US vol. 4; conf. 1981; Nov. 3, 1981; pp. G5301–G5305; XP000989476.

(Continued)

Primary Examiner—Andrew W. Johns
Assistant Examiner—Hussein Akhavannik
(74) Attorney, Agent, or Firm—Sughrue Mion, PLLC

(57) ABSTRACT

A motion estimation method is provided. In the method, respective mean difference values for a current search point within a search block and neighboring search points within the search block are calculated. Then, motion estimation is performed around the current search point if the mean difference value of the current search point is smaller than the mean difference values of the neighboring search points. On the other hand, motion estimation is performed based on the mean difference values of at least some of the neighboring search points if the mean difference value of the current search point is not smaller than the mean difference values of at least one the neighboring search points. The motion estimation method of the present invention does not deteriorate the quality of pictures during image compression in contrast to conventional motion estimation methods and enhances image compression speed by reducing remarkably computational complexity.

34 Claims, 15 Drawing Sheets

OTHER PUBLICATIONS

Plansky H. et al.; "Bilddatenreduktion Und Ihre Anwendung Bei HDTV" Frequenz, Schiele Und Schon Gmbh. Berlin, DE; vol. 46; No. ¾, Mar. 1, 1992; pp. 102–109; XP000305494.

Chen M C et al; "Motion Vector Optimization of Control Grid Interpolation and Overlapped Block Motion Compensation Using Iterative Dynamic Programing" Signal Processing: Theories and Applications, Proceedings of Eusipco, XX,XX; Sep. 10, 1996.

* cited by examiner

CARPHONE

FOREMAN

MOM & DAUGHTER

SUSIE

CARPHONE

MOM & DOUGHTER

MOTION ESTIMATION METHOD

RELATED APPLICATIONS

This application claims priority from U.S. Provisional Application No. 60/221,553, filed on Jul. 28, 2000, and claims priority from Korean Patent Application No. 00-56150, filed on Sep. 25, 2000. Both the Provisional Application and the Korean Patent Application are incorporated herein by reference for all purposes.

FIELD OF THE INVENTION

The present invention relates to a motion estimation method, and more particularly, to a motion estimation method that enables motion to be estimated with relatively low computational complexity.

BACKGROUND OF THE INVENTION

In order to effectively encode motion picture data via high-compression coding techniques, four kinds of redundancies must be removed from the data. First, redundancy in signal constituents must be removed. Second, statistical redundancy, which results from the statistical probability of data generation, must be removed. Third, time redundancy between frames of the motion picture data must be removed. Fourth, spatial redundancy existing within the frames of the motion picture data must be removed.

The redundancy existing in the signal constituents can be reduced by using a signal having a brightness to chromaticity ratio of 2:1. Also, the statistical redundancy can be reduced via a variable length coding technique which uses the probability of data generation during the coding process to reduce the average number of bits of the data. In addition, the spatial redundancy can be reduced by performing discrete cosine transformation ("DCT") techniques. Finally, the time redundancy, which is substantially contained in the moving pictures, can be reduced by motion estimation ("ME") and motion compensation ("MC").

In one motion estimation method, a full search method ("FSM") is used as a block-matching algorithm to reduce the time redundancy. However, when the method is used as a block-matching algorithm, the complexity of an encoder for encoding the motion picture data depends on a motion estimation algorithm. Thus, although this method is capable of highly compressing the motion picture data during the encoding process, the overall performance of the encoder implementing the FSM is low because the block-matching algorithm is extremely complex.

In another motion estimation method, the complexity of the block-matching algorithm is decreased by performing a three-step search ("3SS") or a four-step search ("4SS"). Such types of methods are well-known and will not be described in detailed for the sake of brevity. In such methods, the algorithm analyzes a current block and searches for a block which is the most similar to the current block by comparing the current block with all blocks within a fixed search region. The 3SS method and the 4SS method can estimate motion with a relatively low degree of complexity. However, in order to increase the speed at which motion can be estimated, a motion estimation method that is capable of performing a block matching routine even more quickly is needed. Accordingly, a block matching algorithm that is even less complex than the 3SS method and the 4SS method is required.

SUMMARY OF THE INVENTION

One objective of the present invention to provide a motion estimation method and program that overcome the problems of the prior art.

Another objective of the present invention to provide a motion estimation method and program which can perform fast block matching by reducing computational complexity.

In order to overcome the above and other objects, a motion estimation method is provided. The method comprises: (a) calculating respective mean difference values for a current search point of a search block and neighboring search points within the search block; (b) performing motion estimation around the current search point if the mean difference value of the current search point is smaller than the mean difference values of the neighboring search points; and (c) performing motion estimation based on the mean difference values of at least some of the neighboring search points if the mean difference value of the current search point is not smaller than the mean difference values of at least one the neighboring search points.

In order to further overcome the above and other objects, a software program for performing the motion estimation method is provided.

BRIEF DESCRIPTION OF THE DRAWINGS

The above objectives and advantages of the present invention will become more apparent by describing in detail a preferred embodiment thereof with reference to the attached drawings, in which.

DETAILED DESCRIPTION OF THE PREFERRED EMBODIMENTS

Figure 1A:
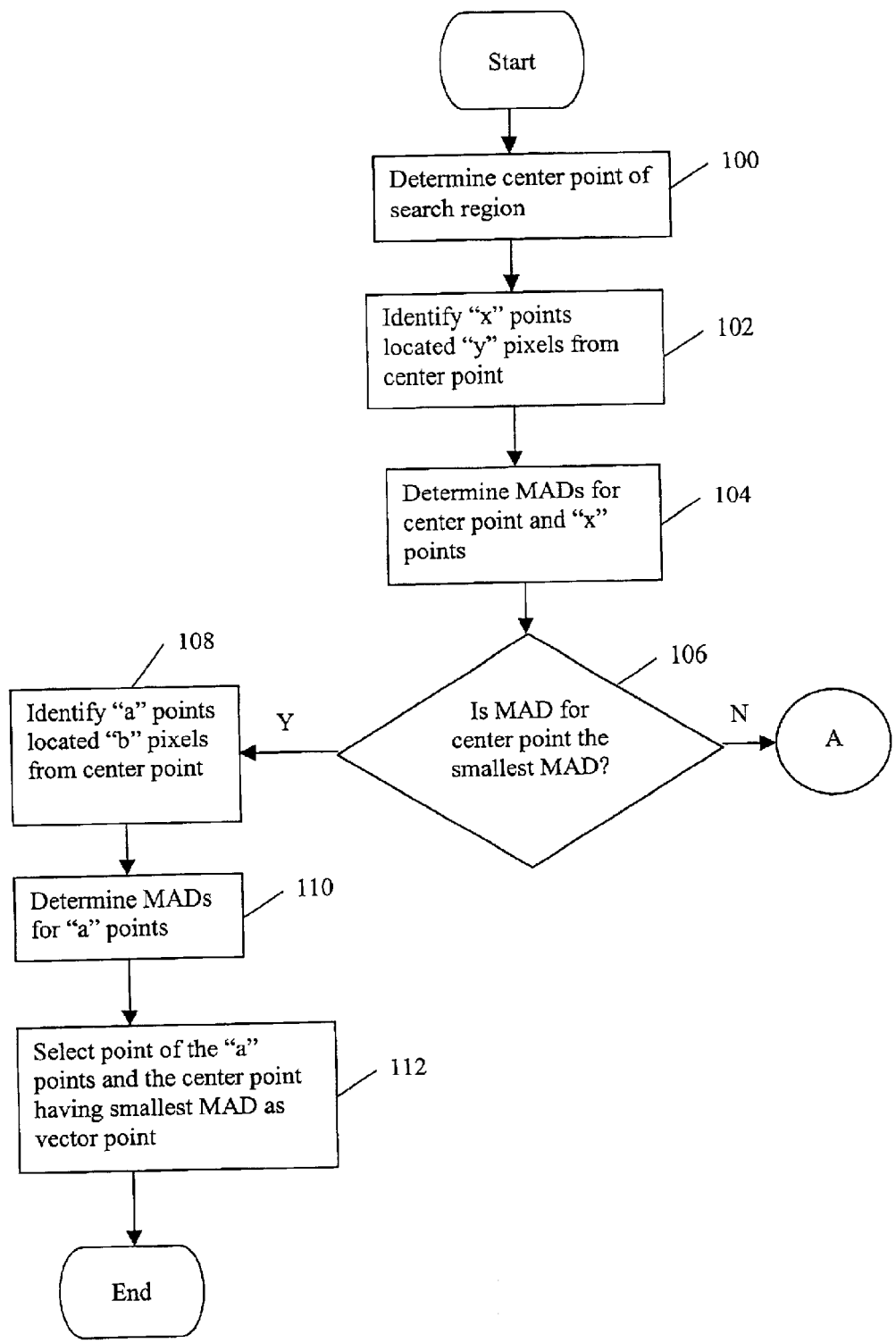
FIG. 1A is a flowchart illustrating a portion of a motion estimation method according to an illustrative embodiment of the present invention.

The following description of the preferred embodiments discloses specific configurations, components, and operations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and operations of the present invention that are known to one skilled in the art are omitted for the sake of clarity and brevity.

FIGS. 1A–1J is a flowchart showing various operations of a motion estimation method according to an illustrative, non-limiting embodiment of the present invention. Such embodiment corresponds to three-step motion estimation operation.

As a preliminary matter, the motion estimation method assumes that frames of a moving picture can be represented by a particular coordinate system (e.g. an x-y coordinate system). In addition, the method assumes that a certain percentage (e.g. about 70%) of a motion vector is concentrated on a particular motion vector coordinate (e.g. the coordinate (0,0)) of the coordinate system and that the moving picture generates frames at a certain rate (e.g. 20–30 frames per second). FIGS. 2A–2D show examples of vector distributions of four quadrature common intermediate formats ("QCIF") for "Carphone," "Foreman," "Mom & Daughter," and "Susie" in image sequence. As shown in FIGS. 2A–2D, the motion vector distributions are concentrated around the coordinate (0,0).

In addition, the present embodiment of the motion estimation method considers a correlation between search points. In particular, the embodiment assumes that most motion vectors tend to migrate towards a coordinate at which the predetermined mean square difference ("MSD") or a mean absolute difference ("MAD") is minimized. Specifically, an arbitrary search point is determined, and if such point has a minimum MSD or MAD, the point is determined as the coordinate for the motion vector. On the other hand, if the arbitrary point does not have the minimum MSD or MAD, correlations between the arbitrary point and neighboring search points are determined based on the MSD or MAD values of the points. Specifically, the difference between the MAD values of the arbitrary search point and a first neighboring search point is determined as a first correlation, and the difference between the MAD values of the arbitrary search point and a second neighboring search point is determined as a second correlation. Then, according to the illustrative embodiment, the method determines that motion generally exists in the direction of the first neighboring search point if the first correlation is smaller than the second correlation. Conversely, the method determines that motion generally exists in the direction of the second neighboring search point if the second correlation is smaller than the first correlation. Since determining the MSD or MAD values of various search points and determining which of the MSD or MAD values are a minimum value is relatively simple, the computational complexity required to implement the present embodiment is relatively simple.

In the present embodiment of the invention, the correlation between two search points is determined based on the difference between the MAD or MSD values of the two points. However, the present invention is not limited to such a configuration, and the correlation between two points can clearly be determined based on other relationships between the points or in other manners.

Figure 3:
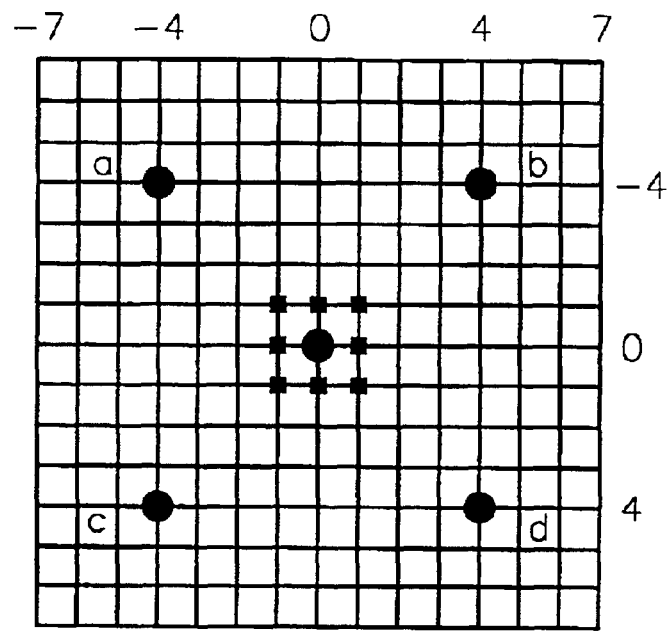
FIG. 3 illustrates an example of determining search points according to the illustrative embodiment of the present invention.

In the present embodiment shown in FIG. 1A, the motion estimation method determines an initial search point. (Operation 100). In one non-limiting, implementation of the method, the initial search point constitutes a center search point that is located at the center a search region with the frames of a moving picture. As shown in FIG. 3, the center of the search region is located at the coordinate (0,0), and thus, the initial search center point is the point located at such coordinate (0,0).

Then, "x" points located "y" pixels from the search center point (0,0) are identified. (Operation 102). In one implementation of the method, "x" and "y" equal four, and as shown in FIG. 3, the method identifies four points "a", "b", "c", and "d" respectively located four pixels from the search center point (0,0). In other words, in such implementation, the points "a", "b", "c", and "d" are respectively located at coordinates (−4,−4), (4,−4), (4,4), and (−4,4). After the points "a" to "d" are identified, the MAD values of the points "a" to "d" and the center point (0,0) are calculated, and the method determines if the MAD value of the center point (0,0) is the smallest MAD value. (Operations 104 and 106).

If the MAD value of the center point (0,0) is the smallest, "a" points located "b" pixels from the search center point (0,0) are identified. (Operation 108). In one implementation of the method, "a" equals eight, "b" equals one, and as shown in FIG. 3, the method identifies eight points respectively located one pixel from the search center point (0,0). In other words, in such implementation, the eight points are respectively located at coordinates (−1,−1), (0,−1), (1,−1), (1,0), (1,1), (0,1), (−1,1), and (−1,0). After the eight points are identified, the MAD values of the points are calculated. (Operation 110). Then, the method determines which point of the eight points and the center point (0,0) has the smallest MAD value and selects such point as the point of the motion vector. (Operation 112).

Figure 1B:
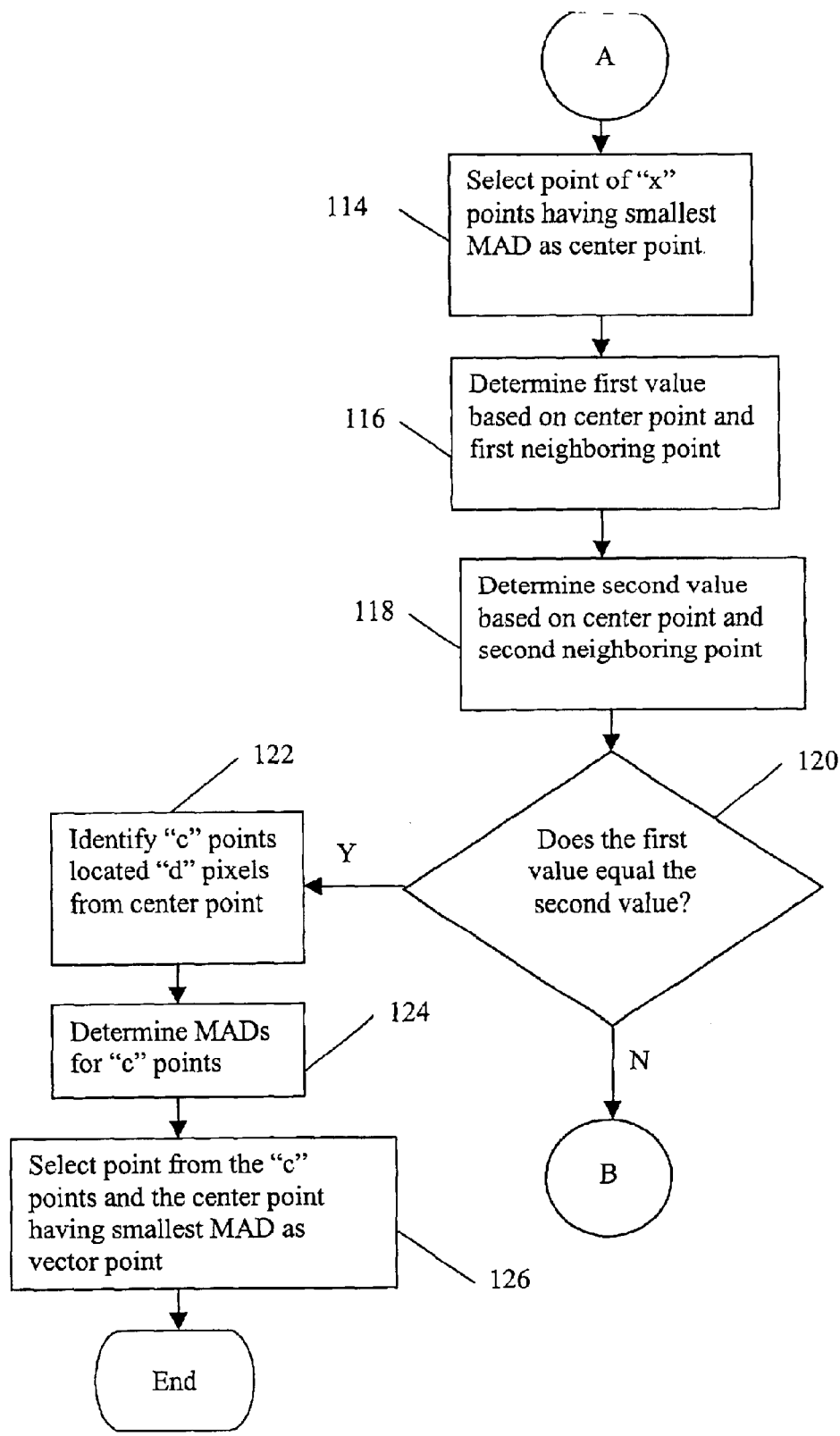
FIG. 1B is a flowchart illustrating a portion of a motion estimation method according to the illustrative embodiment of the present invention.

On the other hand, as shown in FIG. 1B, if the MAD value of the center point (0,0) is not the smallest in operation 106, the point a, b, c, or d having the smallest MAD value is selected as the new center point. (Operation 114). Then, a first value is determined based on the new center point and a first point that is adjacent to the center point (i.e. a first neighboring point). (Operation 116). Similarly, a second value is determined based on the new center point and a second point that is adjacent to the center point (i.e. a second neighboring point). (Operation 118).

An illustrative example of the selecting the new center point, the first and second neighboring points, and the first and second values will be described in conjunction with FIGS. 4A and 4B. As shown in FIG. 4B, the MAD value of the point "d" (i.e. 1399) is smaller than the MAD values of the points "a" to "c". Accordingly, the point "d" is selected as the new center point. Furthermore, since the point "b" and "c" are the two points that are the closest to the point "d", they are selected as the first and second neighboring points, respectively. Then, the first value is determined by calculating the absolute difference between the MAD value of the center point "d" and the MAD value of the first neighboring point "b":

$$|MAD(d)-MAD(b)|=|1399-1430|=31$$

Similarly, the second value is determined by calculating the absolute difference between the MAD value of the center point "d" and the MAD value of the second neighboring point "c":

$$|MAD(d)-MAD(c)|=|1399-1426|=27$$

Another illustrative example of the selecting the new center point, the first and second neighboring points, and the first and second values will be described in conjunction with FIGS. 4A and 4C. As shown in FIG. 4C, the MAD value of the point "a" (i.e. 1928) is smaller than the MAD values of the points "b" to "d". Accordingly, the point "a" is selected as the new center point. Furthermore, since the point "c" and "b" are the two points that are the closest to the point "a", they are selected as the first and second neighboring points, respectively. Then, the first value is determined by calculating the absolute difference between the MAD value of the center point "a" and the MAD value of the first neighboring point "c":

$$|MAD(a)-MAD(c)|=|1928-1951|=23$$

Similarly, the second value is determined by calculating the absolute difference between the MAD value of the center point "a" and the MAD value of the second neighboring point "b":

$$|MAD(a)-MAD(b)|=|1928-2106|=178$$

After the first and second values are determined in operations 116 and 118, the method determines if the first value equals the second value. (Operation 120). If the first value equals the second value, "c" points located "d" pixels from the search center point are identified. (Operation 122). In one implementation of the method, "c" equals eight, "d" equals one, and the method identifies eight points respectively located one pixel from the center point. After the eight points are identified, the MAD values of the points are calculated. (Operation 124). Then, the method determines which point of the eight points and the center point has the smallest MAD value and selects such point as the point of the motion vector. (Operation 126).

For example, if the point "c" shown in FIG. 3 is the search center point and the first value (i.e. |MAD(c)-MAD(d)|) equals the second value (i.e. |MAD(c)-MAD(a)|), the MAD values of eight points located at the coordinates (−5,3), (−4,3), (−3,3), (−3,4), (−3,5), (−4,5), (−5,5), and (−5,4) are determined. Then, the point having the smallest MAD value from among the points at the coordinates (−5,3), (−4,3), (−3,3), (−3,4), (−3,5), (−4,5), (−5,5), and (−5,4) and point "c" (i.e. the coordinate (−4,4)) is selected as the motion vector point.

Figure 1C:
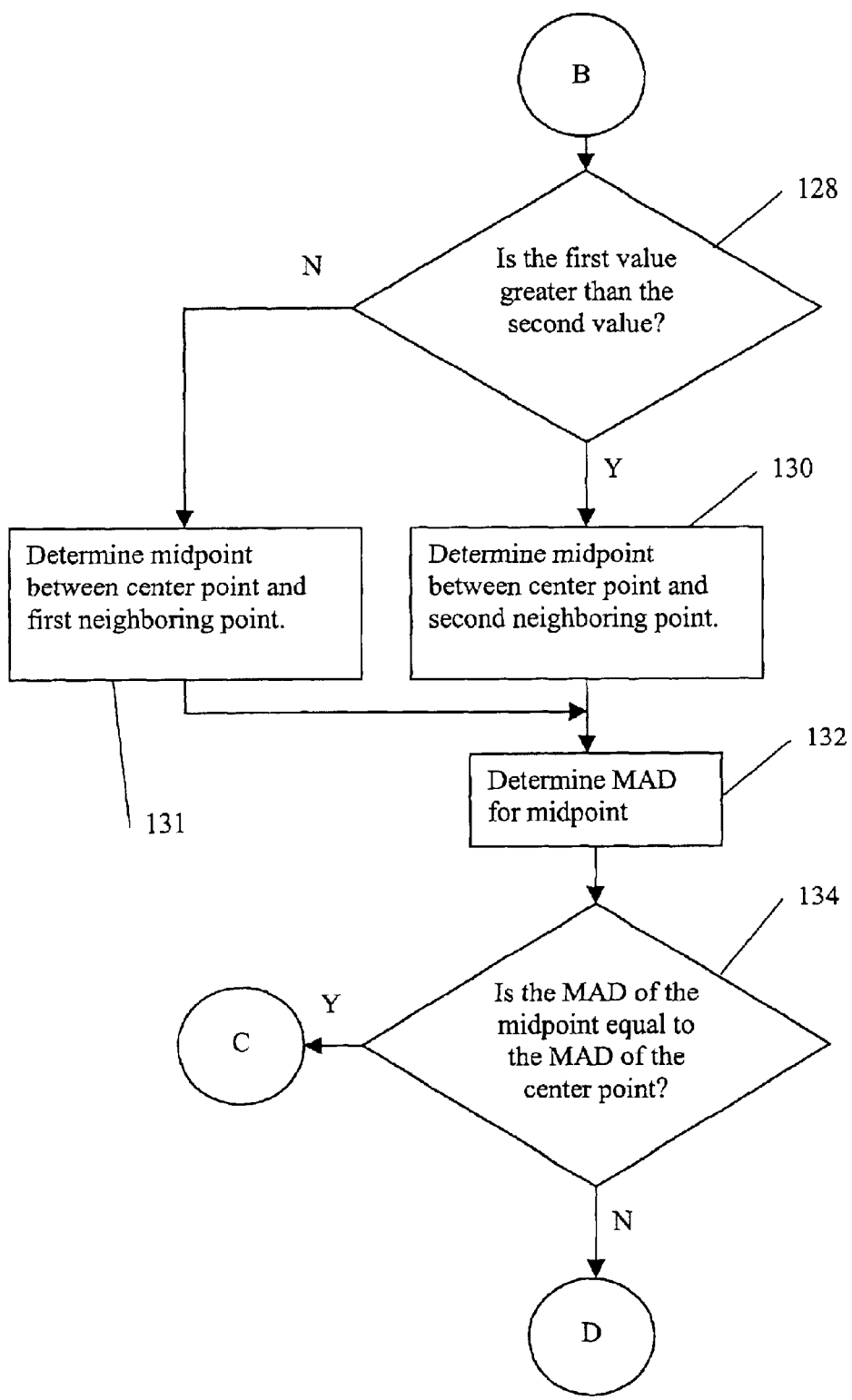
FIG. 1C is a flowchart illustrating a portion of a motion estimation method according to the illustrative embodiment of the present invention.

On the other hand, as shown in FIG. 1C, if the first value does not equal the second value in operation 120, the method determines if the first value is greater than the second value. (Operation 128). If the first value is greater than the second value, a selected point between the center point and the second neighboring point is identified, and the MAD value of the selected point is determined. (Operations 130 and 132). On the other hand, if the first value is less than the second value, a selected point between the center point and the first neighboring point is identified, and the MAD value of the selected point is determined. (Operations 131 and 132). In one implementation of the present embodiment, the selected point is a midpoint between the center point and the first or second neighboring point.

For example, as shown in FIG. 4B, the first value (i.e. |MAD(d)-MAD(b)|) equals 31, and the second value (i.e. |MAD(d)-MAD(c)|) equals 27. Thus, the first value is greater than the second value. As a result, the midpoint "dc" between the center point "d" and the second neighboring point "c" is identified, and the MAD value of the midpoint "dc" is determined. Also, as shown in FIG. 4C, the first value (i.e. |MAD(a)-MAD(c)|) equals 23, and the second value (i.e. |MAD(a)-MAD(b)|) equals 178. Thus, the first value is less than the second value. As a result, the midpoint "ca" between the center point "a" and the first neighboring point "c" is identified, and the MAD value of the midpoint "ca" is determined.

Figure 1D:
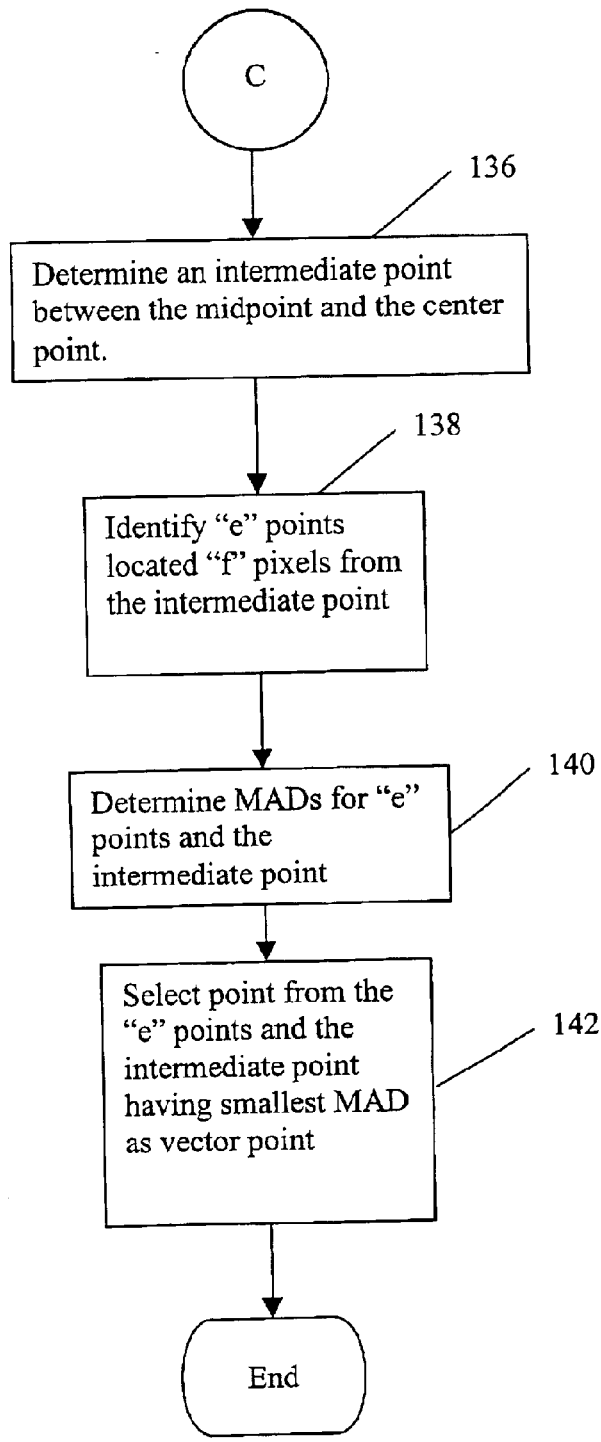
FIG. 1D is a flowchart illustrating a portion of a motion estimation method according to the illustrative embodiment of the present invention.

Once the MAD value of the midpoint is determined in operation 132, the method determines if the MAD value of the midpoint equals the MAD value of the center point. (Operation 134). As shown in FIG. 1D, if the MAD value of the midpoint equals the MAD value of the center point, an intermediate point between the midpoint and the center point is identified. (Operation 136). Then, "e" points located "f" pixels from the intermediate point are identified. (Operation 138). In one implementation of the method, "e" equals eight, "f" equals one, and the method identifies eight points respectively located one pixel from the intermediate point. After the eight points are identified, the MAD values of the eight points and the intermediate point are calculated. (Operation 140). Then, the method determines which point of the eight points and the intermediate point has the smallest MAD value and selects such point as the point of the motion vector. (Operation 142).

Figure 4A:
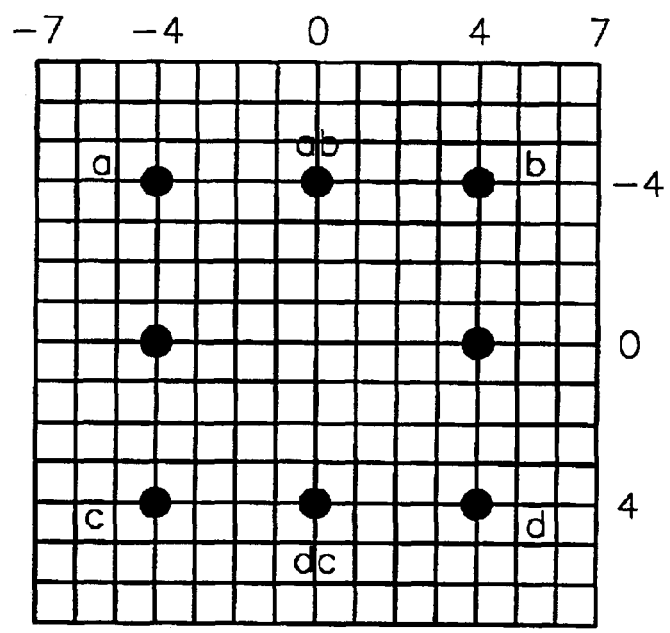
FIG. 4A illustrates an example in which eight search points are determined on test images "Carphone" and "Mom & Daughter"
Figure 4B:
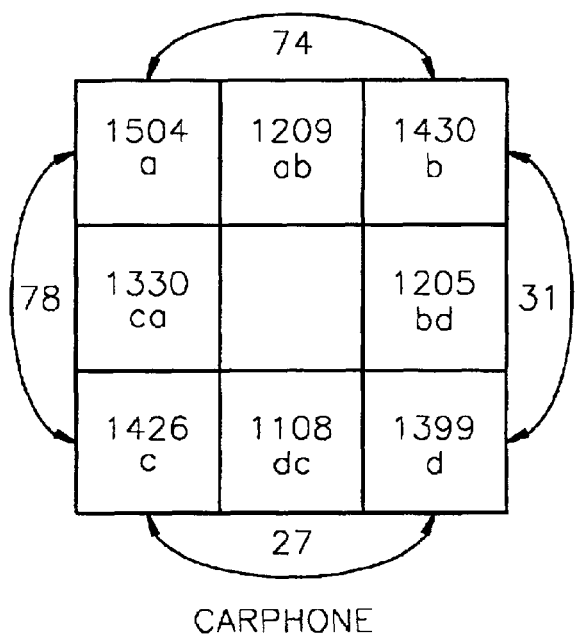
FIG. 4B illustrates an example of resultant calculations of average MAD values at corresponding search points for the test image "Carphone"
Figure 4C:
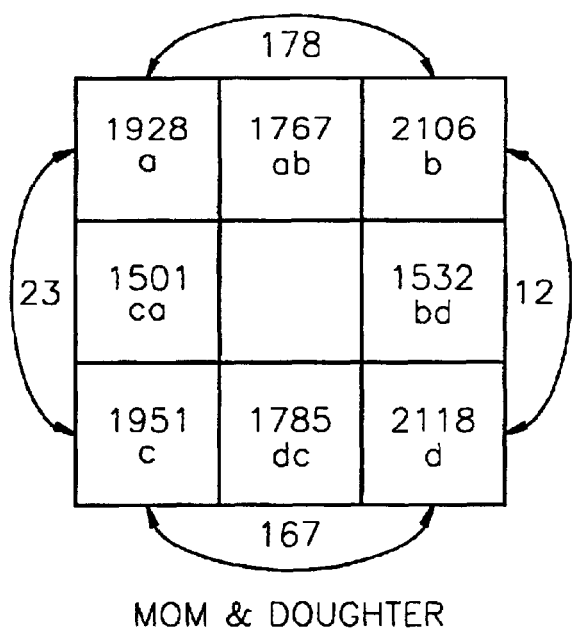
FIG. 4C illustrates an example of resultant calculations of average MAD values at corresponding search points for the test image "Mom & Daughter"

For example, in FIG. 4A, assume that the point "a" is the center point and the point "ab" is the midpoint. Also, assume that the MAD value of the midpoint "ab" equals the MAD value of the center point "a" in operation 134. In such a scenario, an intermediate point between the midpoint "ab" and the center point "a" is identified in operation 136. In one example of the present embodiment, the intermediate point is a midpoint between the center point "a" and the midpoint "ab". In other words, the intermediate point is the point located at the coordinate (−2,−4) in FIG. 4A. Then, in operation 138, eight points (−3,−5), (−2,−5), (−1,−5), (−1,−4), (−1,−3), (−2,−3), (−3,−3), and (−3,−4) located one pixel from the intermediate point (−2,−4) are identified. Finally, in operation 142, the method determines which point of the eight points and intermediate point has the smallest MAD value and selects such point as the point of the motion vector.

Figure 1E:
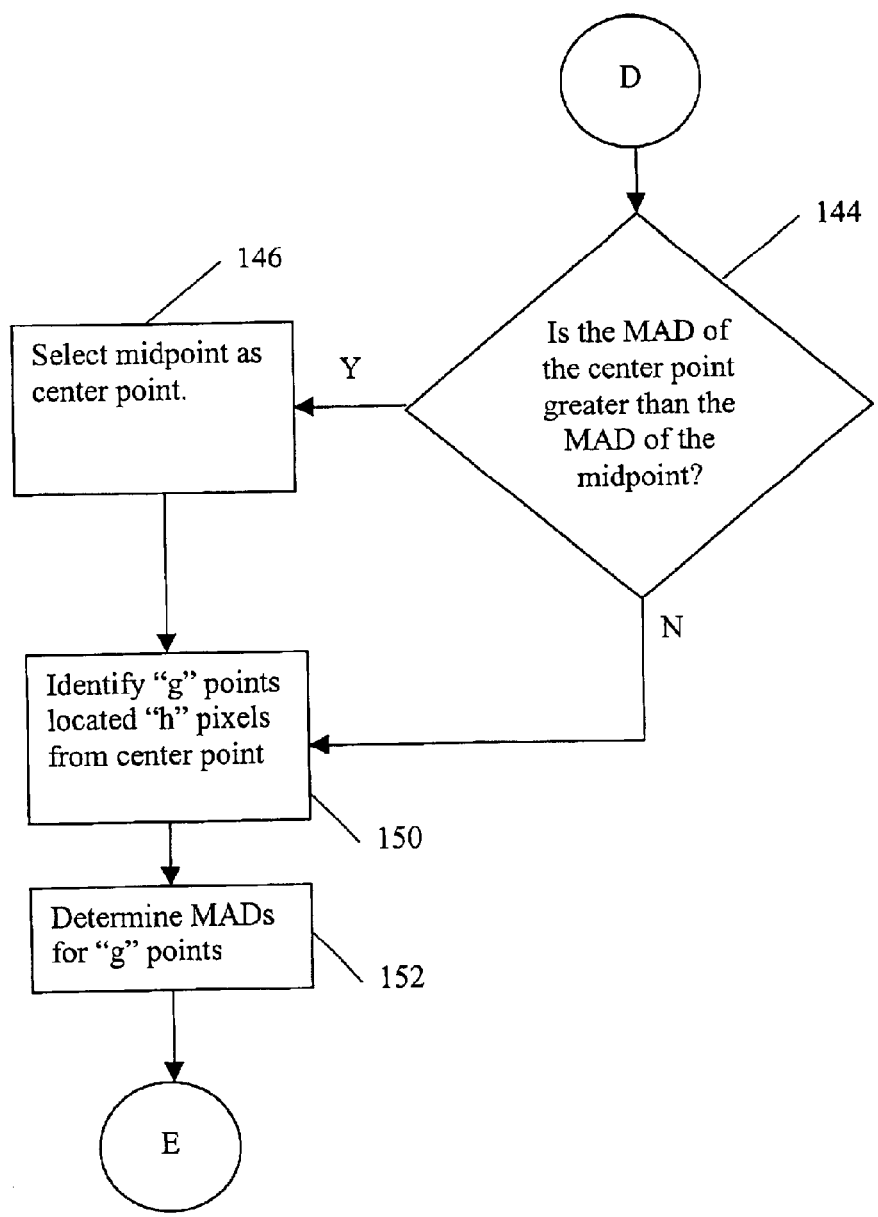
FIG. 1E is a flowchart illustrating a portion of a motion estimation method according to the illustrative embodiment of the present invention.
Figure 1F:
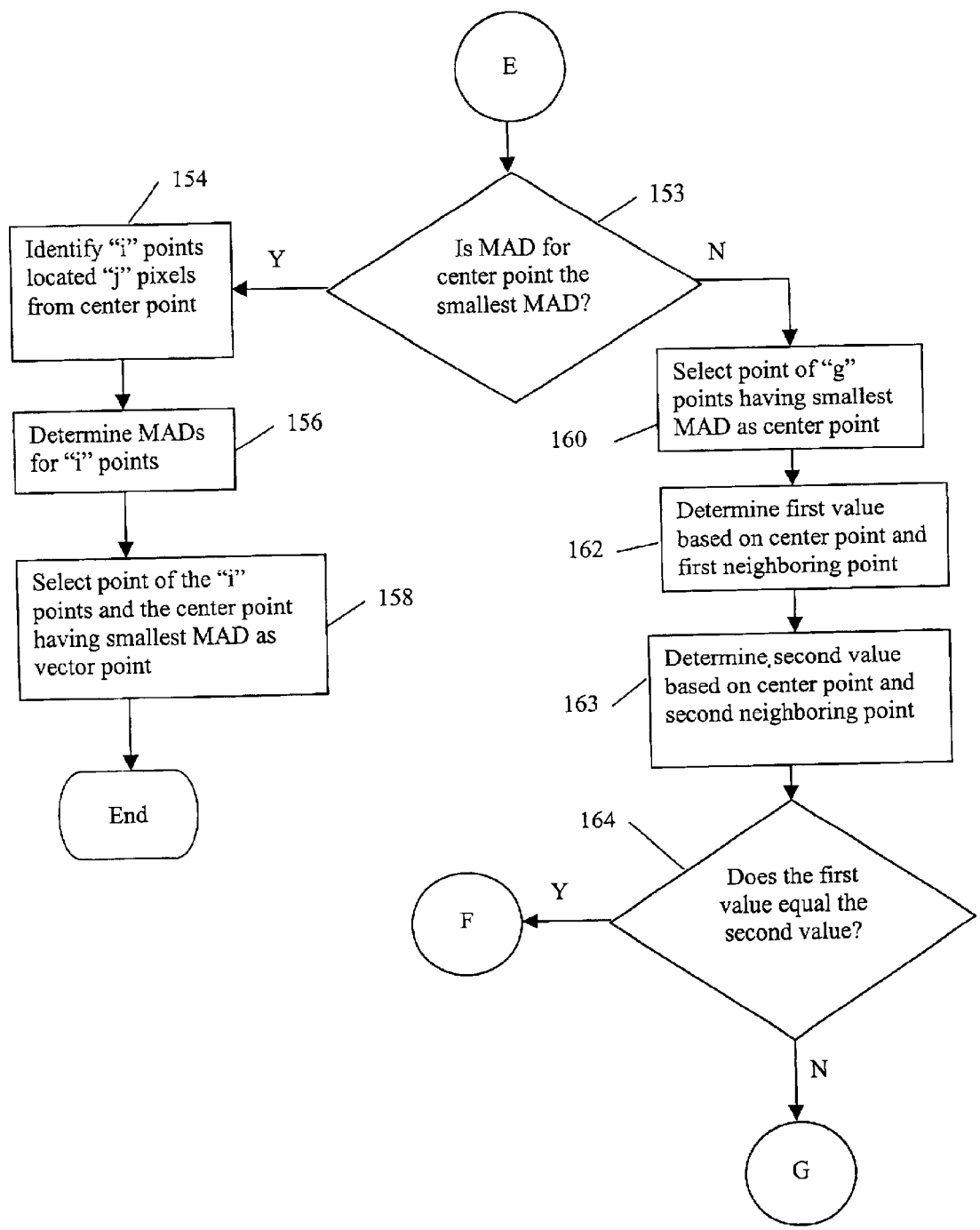
FIG. 1F is a flowchart illustrating a portion of a motion estimation method according to the illustrative embodiment of the present invention.

On the other hand, as shown in FIG. 1E, if the MAD value of the midpoint does not equals the MAD value of the center point in operation 134, the method determines if the MAD of the center point is greater than the MAD of the MAD of the midpoint. (Operation 144). If the MAD of center point is greater than the MAD of the midpoint, the midpoint is selected as the new center point, and "g" points located "h" pixels from the new center point are determined. (Operations 146 and 150). In contrast, if the MAD of center point is less than the MAD of the midpoint, "g" points located "h" pixels from the current center point are determined. (Operation 150). In one example of the present embodiment, "g" equals four, "h" equals two, and four points located two pixels from the center point are determined. Then, the MAD values of the four points are determined. (Operation 152).

For example, as shown in FIG. 4B, the MAD value of the center point "d" (i.e. 1399) is greater than the MAD value of the midpoint "dc" (i.e. 1108). Thus, in operation 146, the midpoint "dc" is selected as the new center point, and four points located two pixels from the new center point are determined. For example, in FIG. 3, the four points located at coordinates (−2,2), (2,2), (2,6), and (−2,6) are selected. Afterwards, in operation 152, the MAD values of the four points are determined.

After the MAD values of the four points are determined in operation 152, the method determines if the MAD of the center point is smaller than all of the MAD values of the four points. (Operation 153). If the MAD value of the center point is the smallest, "i" points located "j" pixels from the center point are identified. (Operation 154). In one implementation of the method, "i" equals eight, "j" equals one, and the method identifies eight points respectively located one pixel from the center point. After the eight points are identified, the MAD values of the eight points are calculated. (Operation 156). Then, the method determines which point of the eight points and the center point has the smallest MAD value and selects such point as the point of the motion vector. (Operation 158).

For instance, in the previous example, the center point is the point "dc", and the four points (−2,2), (2,2), (2,6), and (−2,6) surrounding the center point "dc" were identified. If the MAD value of the center point "dc" is smaller than the MAD values of the points (−2,2), (2,2), (2,6), and (−2,6) in operation 153, eight points located one pixel away from the center point "dc" are identified in operation 154. As shown in FIG. 4A, the eight points are located at the coordinates (−1,3), (0,3), (1,3), (1,4), (1,5), (0,5), (−1,5), and (−1,4). Afterwards, the point of the eight points and the center point "dc" point having the smallest MAD value is selected as the point of the motion vector in operation 158.

On the other hand, if the MAD value of the center point is not smaller than the MAD values of the four points in operation 153, the method determines which of the four points has the smallest MAD value, and selects such point as a new center point. (Operation 160). Then, a first value is determined based on the new center point and a first point that is adjacent to the center point (i.e. a first neighboring point). (Operation 162). Similarly, a second value is determined based on the new center point and a second point that is adjacent to the center point (i.e. a second neighboring point). (Operation 163). The first and second values calculated in operations 162 and 163 may or may not be analogous to the first and second values calculated in operations 116 and 118.

Again, using the previous example, the center point is the point "dc" shown in FIG. 4A, and the four points (−2,2), (2,2), (2,6), and (−2,6) surround the center point "dc". If the MAD value of the center point "dc" is not smaller than all of the MAD values of the four points (−2,2), (2,2), (2,6), and (−2,6) in operation 153, a point of the four points (−2,2), (2,2), (2,6), and (−2,6) having the smallest MAD value is selected as the new center point in operation 160. For instance, if the MAD value of the point (2,6) is smaller than the all of the MAD values of the points (−2,2), (2,2), and (−2,6), the point (2,6) is selected as the new center point.

Furthermore, since the points (2,2) and (−2,6) are the two points that are the closest to the center point (2,6), they are selected as the first and second neighboring points, respectively. As a result, in operation 162, the first value is determined by calculating the absolute difference between the MAD value of the center point (2,6) and the MAD value of the first neighboring point (2,2):

$$|MAD(2,6)-MAD(2,2)|$$

Similarly, in operation 163, the second value is determined by calculating the absolute difference between the MAD value of the center point (2,6) and the MAD value of the second neighboring point (−2,6):

$$|MAD(2,6)-MAD(-2,6)|$$

Figure 1G:
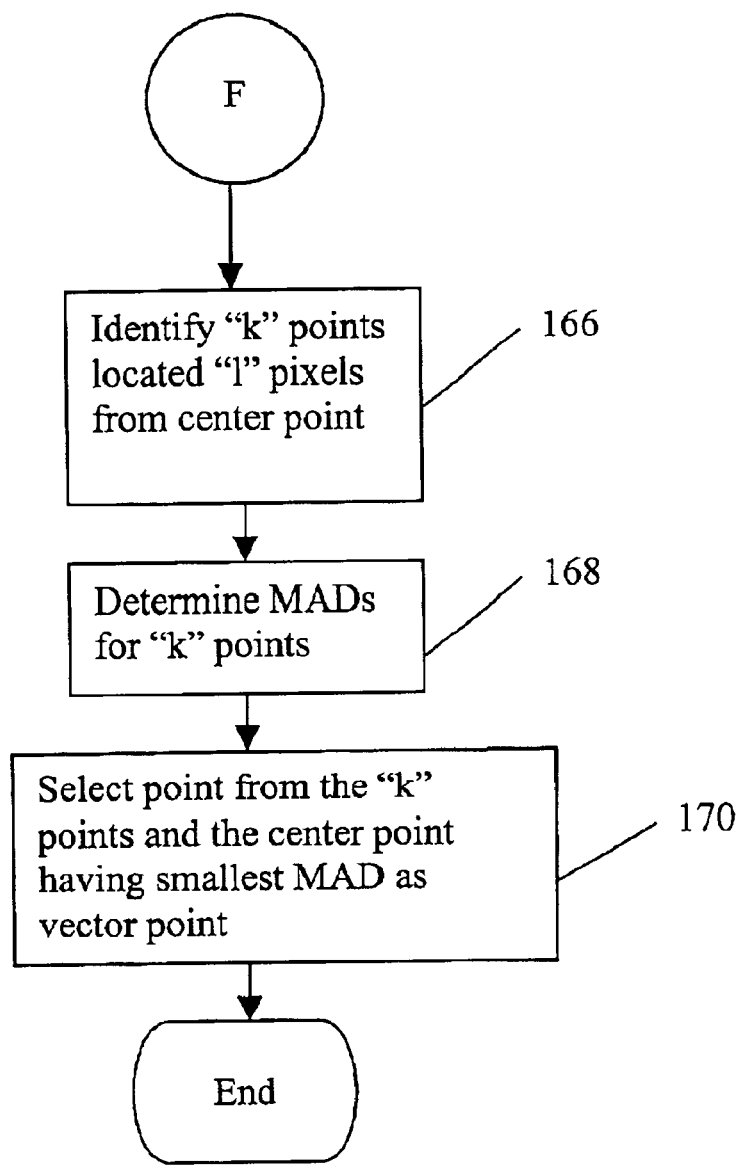
FIG. 1G is a flowchart illustrating a portion of a motion estimation method according to the illustrative embodiment of the present invention.

After the first and second values are calculated, the method determines if the first and second values are equal. (Operation 164). Then, as shown in FIG. 1G, if the first value equals the second value, "k" points located "l" pixels from the center point are identified. (Operation 166). In one implementation of the method, "k" equals eight, "l" equals one, and the method identifies eight points respectively located one pixel from the center point. After the eight points are identified, the MAD values of the points are calculated. (Operation 168). Then, the method determines which point of the eight points and the center point has the smallest MAD value and selects such point as the point of the motion vector. (Operation 170).

For example, in the previous example, if the point (2,6) is the center point and the first value (i.e. |MAD(2,6)−MAD(2,2)|) equals the second value (i.e. |MAD(2,6)−MAD(−2,6)|), the eight points located at the coordinates (1,5), (2,5), (3,5), (3,6), (3,7), (2,7), (1,7), and (1,6) are identified in operation 166. Then, the point having the smallest MAD value from among the points at the coordinates (1,5), (2,5), (3,5), (3,6), (3,7), (2,7), (1,7), and (1,6) and the center point (2,6) is selected as the motion vector point in operations 168 and 170.

Figure 1H:
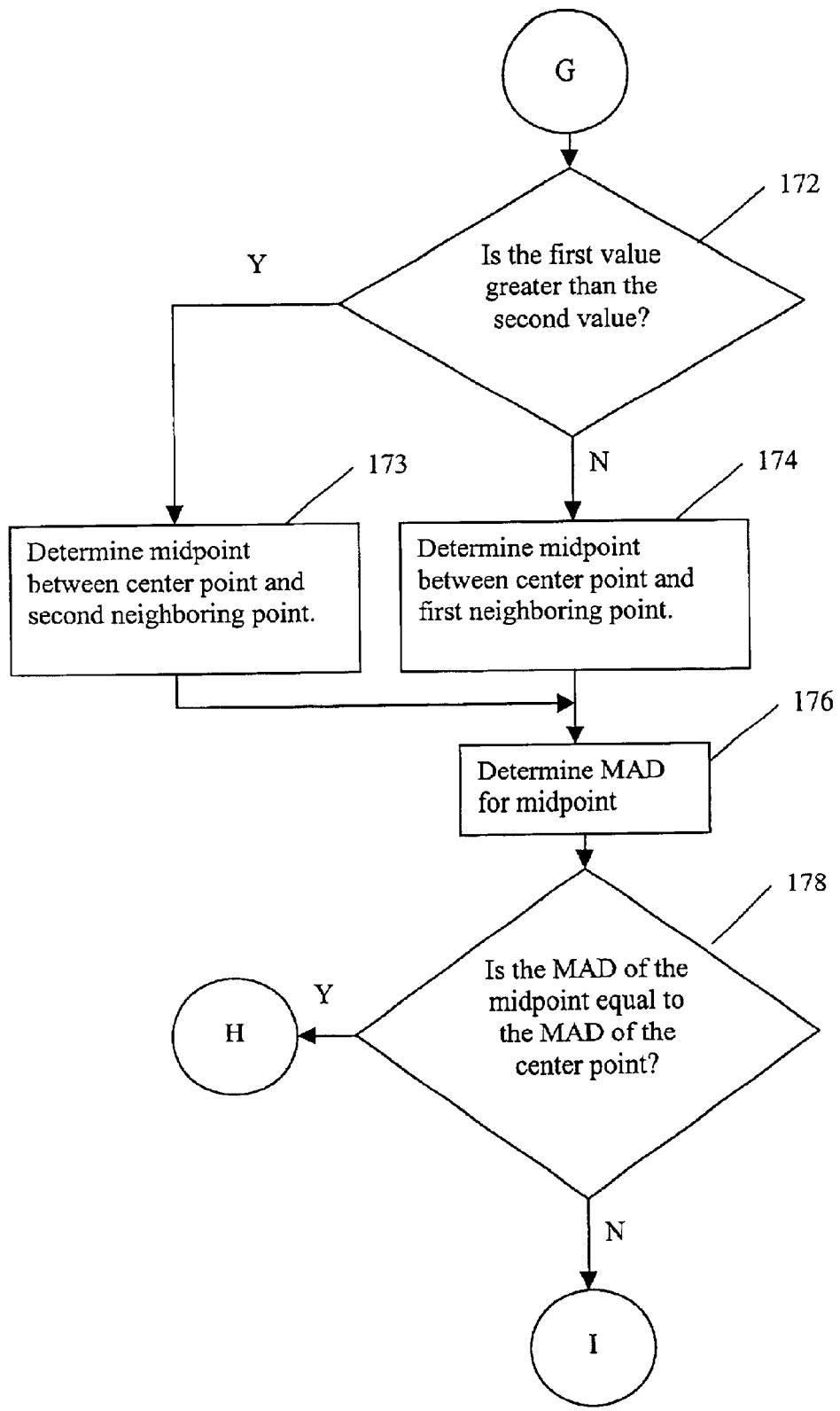
FIG. 1H is a flowchart illustrating a portion of a motion estimation method according to the illustrative embodiment of the present invention.

On the other hand, as shown in FIG. 1H, if the first value does not equal the second value in operation 164, the method determines if the first value is greater than the second value. (Operation 172). If the first value is greater than the second value, a selected point between the center point and the second neighboring point is identified, and the MAD value of the selected point is determined. (Operations 173 and 176). On the other hand, if the first value is less than the second value, a selected point between the center point and the first neighboring point is identified, and the MAD value of the selected point is determined. (Operations 174 and 176). Again, as discussed above, the selected point may be a midpoint between the center point and the first or second neighboring point or some other point between the center point and the first or second neighboring point.

In the previous example discussed in conjunction with FIG. 4A, the center point is the point (2,6), the first neighboring point is the point (2,2), the second neighboring point is the point (−2,6), the first value equals |MAD(2,6)−MAD(2,2)|, and the second value equals |MAD(2,6)−MAD(−2,6)|. If the first value |MAD(2,6)−MAD(2,2)| is greater than the second value |MAD(2,6)−MAD(−2,6)| in operation 172, the midpoint (0,6) between the center point (2,6) and the second neighboring point (−2,6) is identified, and the MAD value of the midpoint (0,6) is determined in operations 173 and 176. On the other hand, if the first value |MAD(2,6)−MAD(2,2)| is less than the second value |MAD(2,6)−MAD(−2,6)| in operation 172, the midpoint (2,4) between the center point (2,6) and the first neighboring point (2,2) is identified, and the MAD value of the midpoint (2,4) is determined in operations 174 and 176.

Figure 1I:
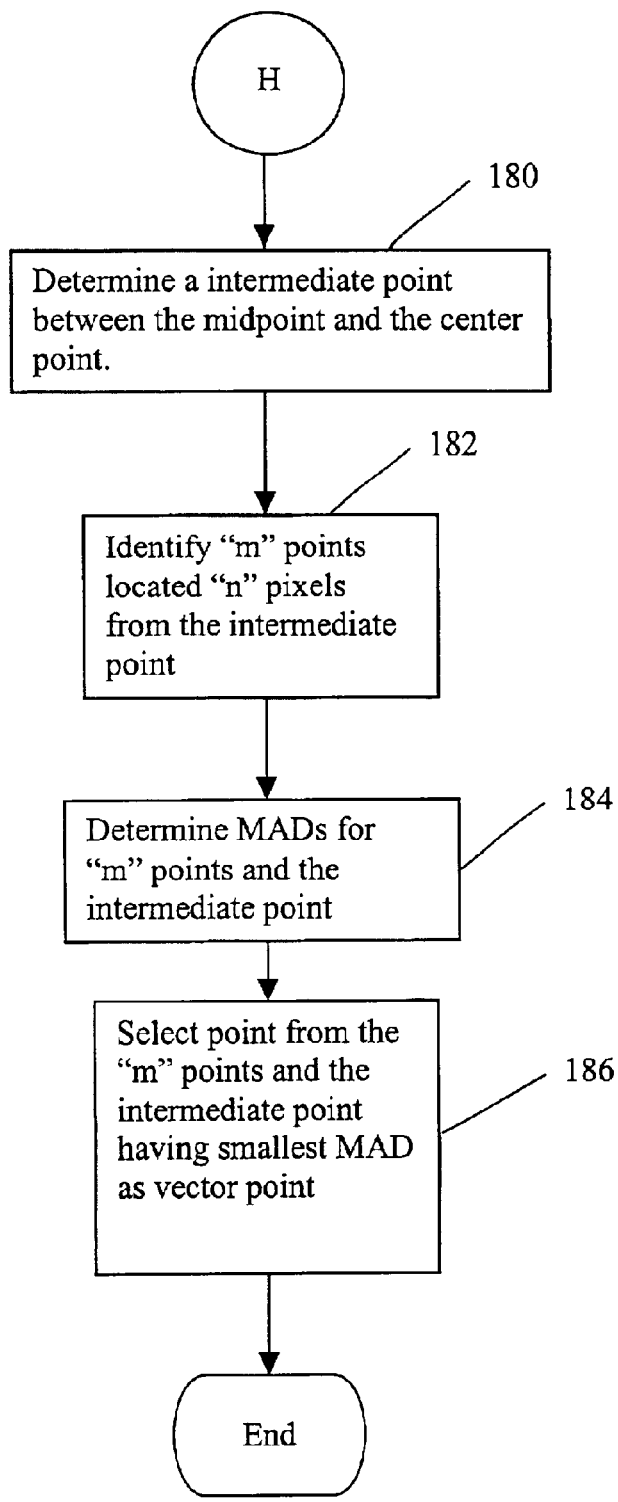
FIG. 1I is a flowchart illustrating a portion of a motion estimation method according to the illustrative embodiment of the present invention.

Once the MAD value of the midpoint is determined in operation 176, the method determines if the MAD value of the midpoint equals the MAD value of the center point. (Operation 178). As shown in FIG. 1I, if the MAD value of the midpoint equals the MAD value of the center point, an intermediate point between the midpoint and the center point is identified. (Operation 180). Then, "m" points located "n" pixels from the intermediate point are identified. (Operation 182). In one implementation of the method, "m" equals eight, "n" equals one, and the method identifies eight points respectively located one pixel from the intermediate point. After the eight points are identified, the MAD values of the eight points and the intermediate point are calculated. (Operation 184). Then, the method determines which point of the eight points and the intermediate point has the smallest MAD value and selects such point as the point of the motion vector. (Operation 186).

For example, in the previous example discussed above in conjunction with FIG. 4A, the point (2,6) is the center point and the point (0,6) is the midpoint. If the MAD value of the midpoint (0,6) equals the MAD value of the center point (2,6) in operation 178, an intermediate point between the midpoint (0,6) and the center point (2,6) is identified in operation 180. As mentioned above, the intermediate point may be a midpoint between the center point (2,6) and the midpoint (0,6). In such a scenario, the intermediate point is the point (1,6) shown in FIG. 4A. Then, in operation 182, eight points (0,5), (1,5), (2,5), (2,6), (2,7), (1,7), (0,7), and (0,6) located one pixel from the intermediate point (1,6) are identified. Finally, in operation 186, the method determines which point of the eight points and intermediate point has the smallest MAD value and selects such point as the point of the motion vector.

Figure 1J:
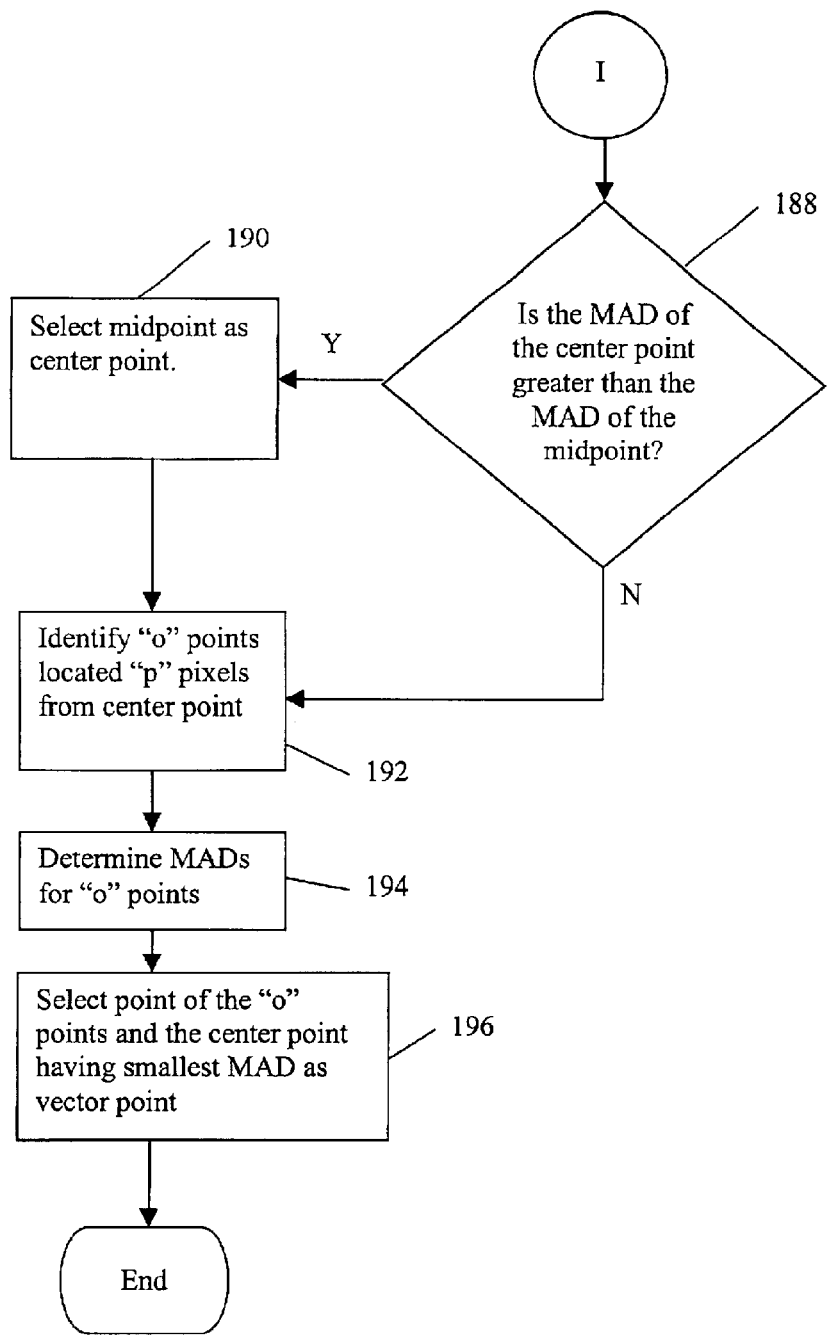
FIG. 1J is a flowchart illustrating a portion of a motion estimation method according to the illustrative embodiment of the present invention.
Figure 2A:
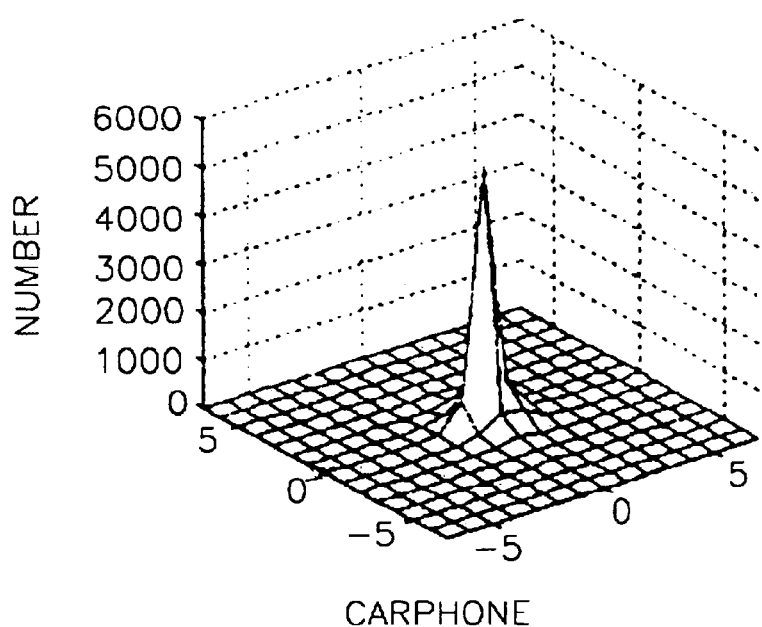
FIG. 2A illustrates a motion vector distribution of an image sequence for "Car Phone" having a quadrature common intermediate format.
Figure 2B:
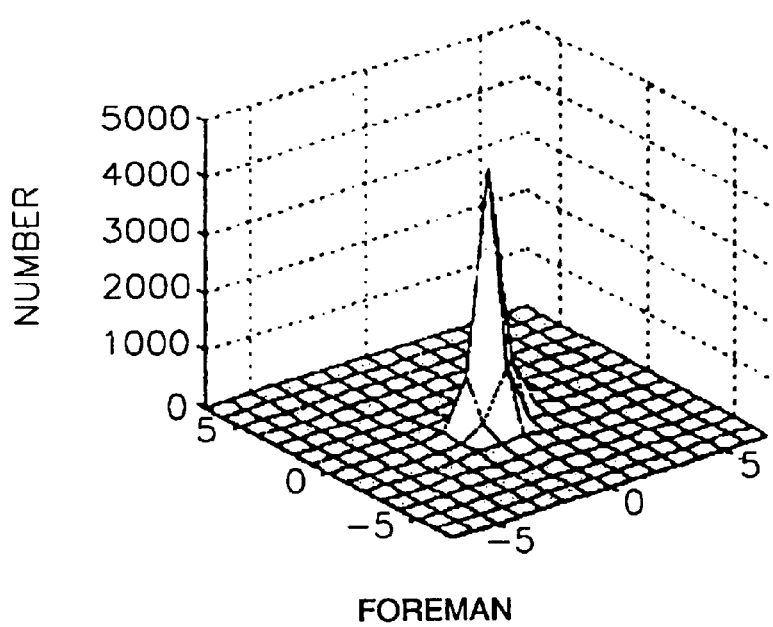
FIG. 2B illustrates a motion vector distribution of an image sequence for "Foreman" having the quadrature common intermediate format.
Figure 2C:
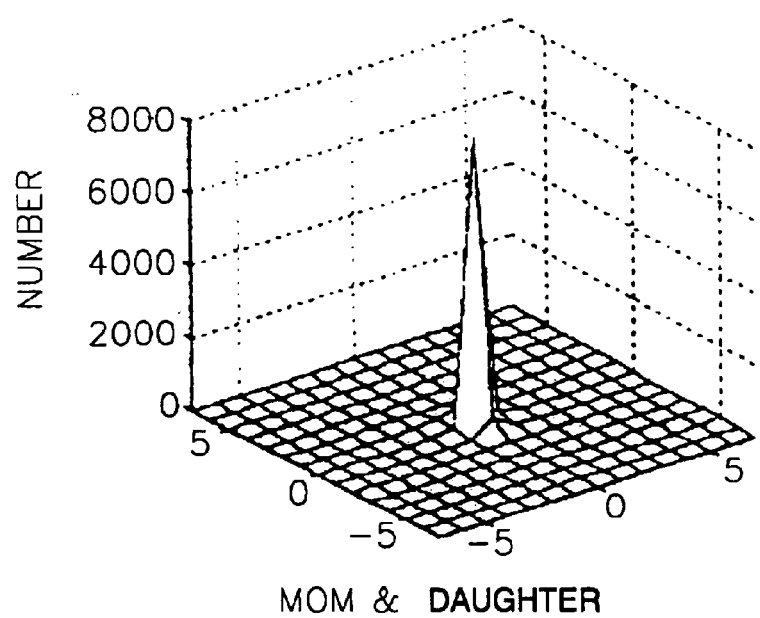
FIG. 2C illustrates a motion vector distribution of an image sequence for "Mom & Daughter" having the quadrature common intermediate format.
Figure 2D:
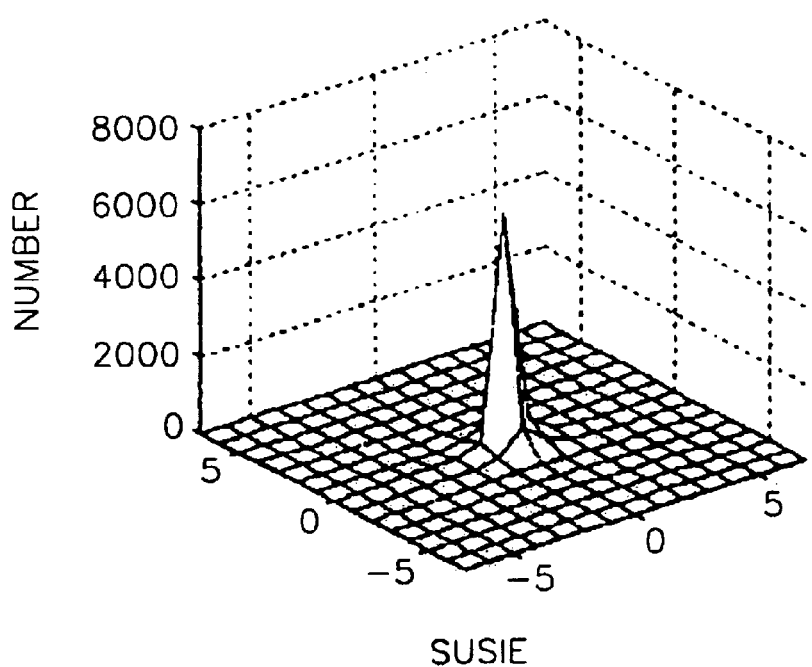
FIG. 2D illustrates a motion vector distribution of an image sequence for "Susie" having a quadrature common intermediate format.

On the other hand, as shown in FIG. 1J, if the MAD value of the midpoint does not equal the MAD value of the center point in operation 178, the method determines if the MAD of the center point is greater than the MAD of the midpoint. (Operation 188). If the MAD of center point is greater than the MAD of the midpoint, the midpoint is selected as the new center point, and "o" points located "p" pixels from the new center point are determined. (Operations 190 and 192). In contrast, if the MAD of center point is less than the MAD of the midpoint, "o" points located "p" pixels from the current center point are determined. (Operation 150). In one example of the present embodiment, "o" equals eight, "p" equals one, and eight points located one pixel from the center point are determined. Then, the MAD values of the eight points are determined. (Operation 194). Then, the method determines which point of the eight points and the center point has the smallest MAD value and selects such point as the point of the motion vector. (Operation 196).

Continuing with the example discussed above in conjunction with FIG. 4A, if the MAD value of the center point (2,6) is greater than the MAD value of the midpoint (0,6) in operation 188, the midpoint (0,6) is selected as the new center point in operation 190. Then, eight points located one pixel from the center point (0,6) are determined. For example, in FIG. 4A, the eight points located at coordinates (−1,5), (0,5), (1,5), (1,6), (1,7), (0,7), (−1,7), and (−1,6) may be selected. Afterwards, in operation 194, the MAD values of the eight points are determined, and point (0,6), (−1,5), (0,5), (1,5), (1,6), (1,7), (0,7), (−1,7), and (−1,6) having the smallest MAD value is selected as the point of the motion vector in operation 196.

Figure 5:
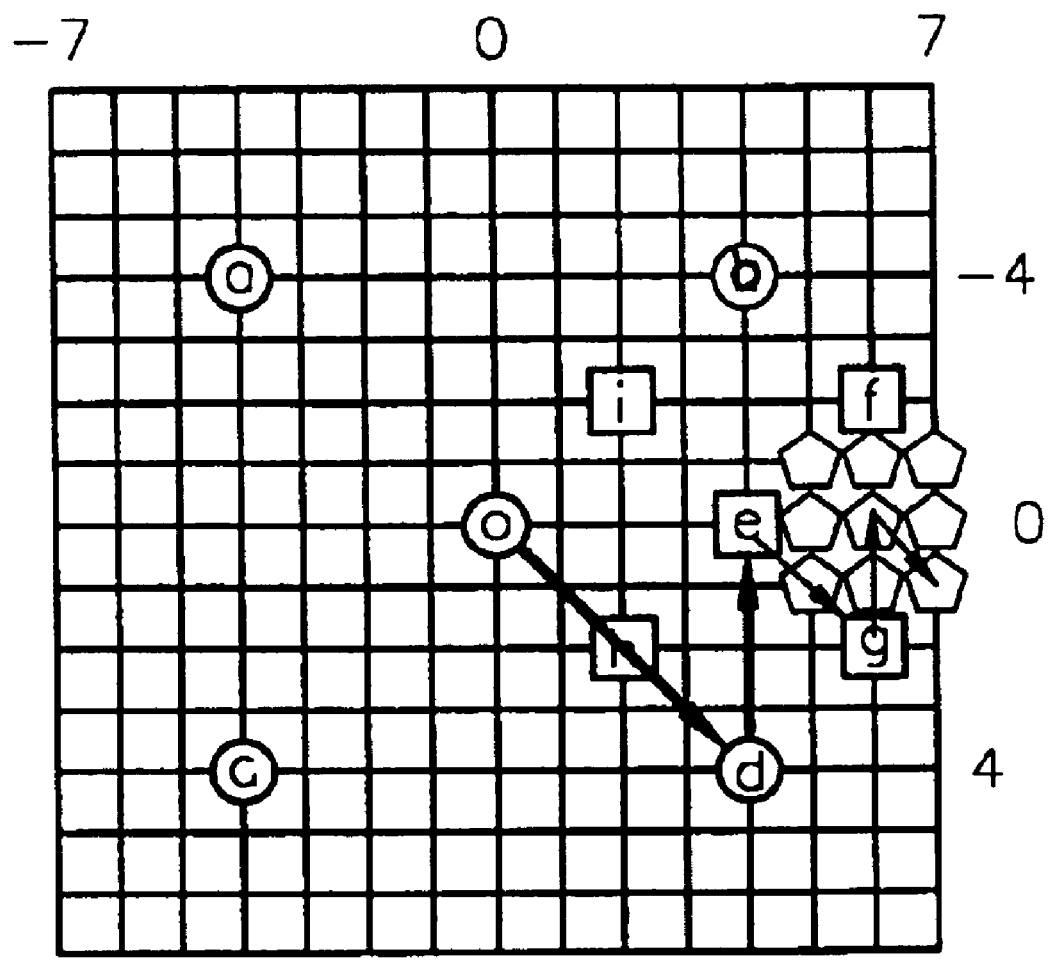
FIG. 5 illustrates an example of estimating a motion vector.

FIG. 5 illustrates a complete example of estimating a motion vector in accordance with the present embodiment shown in FIGS. 1A–1J. As shown in the figure, the center "o" of a 15 pixel×15 pixel search region is identified, and four points "a", "b", "c", and "d" located two pixels from the center point "o" are identified. (Operations 100 and 102). Then, the method calculates the MAD values of the points "a", "b", "c", "d", and "o" and determines that the point "d" has the smallest MAD value. (Operations 104 and 106). Accordingly, the point "d" is selected as the new center point. (Operation 114).

Subsequently, a first value |MAD(d)−MAD(b)| is determined based on the center point "d" and a first neighboring point "b", and a second value |MAD(d)−MAD(c)| is determined based on the center point "d" and a second neighboring point "c". (Operations 116 and 118). In the present example, the first value |MAD(d)−MAD(b)| is less than the second value |MAD(d)−MAD(c)|, and thus, a midpoint "e" between the center point "d" and the first neighboring point "b" is determined, and the MAD value of the midpoint "e" is calculated. (Operations 120, 128, 131 and 132).

Furthermore, in the present example, the MAD value of the center point "d" is greater than the MAD value of the midpoint "e", and thus, the midpoint "e" is selected as a new center point. (Operations 134, 144, and 146). Then, four points "f", "g","h", and "i" located two pixels away from the center point "e" are identified, and the MAD values of the points "f", "g", "h", and "i" are determined. (Operations 150 and 152). In the present example, the MAD value of the point "i" is smaller than the MAD values of the points "e", "f", "g", and "h", and thus, the point "i" is selected as the new center point. (Operations 153 and 160).

Afterwards, a first value |MAD(i)−MAD(g)| is determined based on the center point "i" and a first neighboring point "g", and a second value |MAD(i)−MAD(h)| is determined based on the center point "i" and a second neighboring point "h". (Operations 162 and 163). In the present example, the first value |MAD(i)−MAD(g)| is less than the second value |MAD(i)−MAD(h)|, and thus, a midpoint "j" between the center point "i" and the first neighboring point "g" is determined. (Operations 164, 172, and 174). Then, the MAD value of the midpoint "j" is calculated. (Operation 176).

In the present example, the MAD value of the center point "i" is greater than the MAD value of the midpoint "j", and thus, the midpoint "j" is selected as a new center point. (Operations 178, 188, and 190). Then, eight points (5,1), (6,1), (7,1), (7,0), (7,−1), (6,−1), (5,−1), and (5,0) located one pixel away from the center point "j" are identified, and the MAD values of the points (5,1), (6,1), (7,1), (7,0), (7,−1), (6,−1), (5,−1), and (5,0) are determined. (Operations 192 and 194). Since the MAD value of the point (7,1) is smaller than the MAD values of the points (5,1), (6,1), (7,0), (7,−1), (6,−1), (5,−1), and (5,0), the point (7,1) is selected as the point of the motion vector. (Operation 196). In other words, the motion vector is defined from the point "o" to the point (7,1).

A test experiment was performed to evaluate the performance of conventional motion estimation methods and the motion estimation method of the present embodiment. The conventional methods included a full search method ("FSM"), which estimates motion with the highest precision, a three-step search ("3SS"), which estimates motion relatively fast, and a four-step search ("4SS"), which has become recently recognized as having good performance. An average search point ("ASP") per macro block is chosen as a reference for comparing the computational complexity of the various methods, and the results of such comparison is illustrated in Table 1.

TABLE 1

|  | Car Phone | Foreman | Mom & Daughter | Susie |
|---|---|---|---|---|
| FSM | 225 | 225 | 225 | 225 |
| 3SS | 25 | 25 | 25 | 25 |
| 4SS | 17.0249 | 17.2818 | 17.0039 | 17.5189 |
| Present Invention | 13.6019 | 13.6512 | 13.2085 | 13.5189 |

Referring to Table 1, the motion estimation method of the present embodiment has a smaller ASP per macro block than the conventional motion estimation methods (i.e. FSM, 3SS, 4SS). Thus, the present embodiment remarkably reduces computational complexity of estimating motion and enhances image compression speed.

Also, PSNR, which is expressed in decibels ("db"), is used as a reference for comparing the precision of the various motion estimation methods. Table 2 shows the results of measuring the average PSNR for 100 frames of a test image evaluated using each of the methods.

TABLE 2

|  | Car Phone | Foreman | Mom & Daughter | Susie |
|---|---|---|---|---|
| FSM | 32.1984 | 30.619 | 37.4603 | 35.3273 |
| 3SS | 31.9917 | 30.2156 | 37.3863 | 35.0973 |
| 4SS | 31.9952 | 30.2805 | 37.3922 | 35.0892 |
| Present Invention | 31.9009 | 30.3276 | 37.3896 | 34.9263 |

Referring to Table 2, the motion estimation method of the present embodiment does not substantially deteriorate the quality of pictures during the image compression process in comparison to the conventional motion estimation methods (i.e. FSM, 3SS, 4SS).

Also, in the present embodiment discussed above, the method estimated motion by analyzing the MAD values of various points. However, the present invention is not limited to such an analysis, and other techniques for estimating motion may be used. For example, the method may analyze the MSD values in a manner that is similar to the manner in which the MAD values are analyzed.

In addition, the motion estimation method of the present invention can be incorporated into a software program that is executed by a processor. The software program may be supplied to the processor via a read only memory ("ROM"), a random access memory ("RAM"), a floppy disk, a hard disk, an optical disk, a carrier wave (e.g. a carrier wave transmitted via the internet, a vertical blanking interval of a television signal, etc.), or any other computer readable medium. In addition, the processor may be contained within a personal computer, a server computer, or any other type of processing machine.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For instance, the above embodiments refer to parameters and coordinates that have specific values and refer to specific operations that are performed. However, the present invention is not limited to such parameters and coordinates having such values and is not limited to the specific operations performed above. Furthermore, many of the operations illustrated above may be deleted or performed in many different sequences. In addition, upon reading the present application, one skilled in the art clearly would know how to incorporate other operations into the method disclosed above without the use of inventive faculty. Therefore, the present invention is not intended to be limited to the embodiments described herein but is to be accorded the widest scope as defined by the limitations of the claims and equivalents thereof.

What is claimed is:

1. A motion estimation method comprising:
   (a) calculating respective mean difference values for a current search point of a search block and neighboring search points within the search block;
   (b) performing motion estimation around the current search point if the mean difference value of the current search point is smaller than the mean difference values of the neighboring search points; and
   (c) performing motion estimation based on the mean difference values of at least some of the neighboring search points if the mean difference value of the current search point is not smaller than the mean difference values of at least one the neighboring search points, wherein the operation (c) comprises:
   (c1) selecting a new current search point from among said neighboring search points, wherein said new current search point has a smallest mean difference value of the neighboring search points;
   (c2) determining a first value based on a first predetermined relationship of the mean difference value of the new current search point and the mean difference value of a first neighboring search point;
   (c3) determining a second value based on a second predetermined relationship of the mean difference value of the new current search point and the mean difference value of a second neighboring search point; and
   (c4) performing motion estimation based on a first correlation between the first value and the second value.

2. The method as claimed in claim 1, wherein the first predetermined relationship is an absolute difference between the mean difference value of the new current search point and the mean difference value of the first neighboring search point, and
   wherein the second predetermined relationship is an absolute difference between the mean difference value of the new current search point and the mean difference value of the second neighboring search point.

3. The method as claimed in claim 2, wherein the mean difference values are mean absolute difference values.

4. The method as claimed in claim 2, wherein the mean difference values are mean square difference values.

5. The method as claimed in claim 1, wherein the mean difference values are mean absolute difference values.

6. The method as claimed in claim 1, wherein the mean difference values are mean square difference values.

7. The method as claimed in claim 1, wherein operation (c4) comprises:
   (c4a) determining if the first value equals the second value;
   (c4b) if the first value equals the second value, determining a first predetermined number of first search points disposed a first predetermined pixel distance from the new current search point, wherein said first search points and the new current search point form a first group of points; and (c4c) if the first value equals the second value, determining respective mean difference values of the first search points; and (c4d) if the first value equals the second value, selecting the motion vector point from among the first group of points, wherein the motion vector point has a smallest mean difference value of the first group of points.

8. The method as claimed in claim 1, wherein operation (c4) comprises:

(c4a) determining if the first value is greater than the second value;

(c4b) if the first value is greater than the second value, determining a first intermediate point between the new current search point and the second neighboring point; and (c4c) if the first value is greater than the second value, determining a mean difference value for the first intermediate point.

9. The method as claimed in claim 8, wherein the operation (c4c) comprises:

(c4c1) determining if the mean difference value of the first intermediate point equals the mean difference value of the new current search point;

(c4c2) if the mean difference value of the first intermediate point equals the mean difference value of the new current search point, determining a second intermediate point between the first intermediate point and the new current search point;

(c4c3) if the mean difference value of the first intermediate point equals the mean difference value of the new current search point, determining a first predetermined number of first search points disposed a first predetermined pixel distance from the second intermediate point, wherein the first search points and the second intermediate point form a first group of points;

(c4c4) if the mean difference value of the first intermediate point equals the mean difference value of the new current search point, determining respective mean difference values of the first search points; and (c4c5) if the mean difference value of the first intermediate point equals the mean difference value of the new current search point, selecting the motion vector point from among the first group of points, wherein the motion vector point has a smallest mean difference value of the first group of points.

10. The method as claimed in claim 8, wherein the operation (c4c) comprises:

(c4c1) determining if the mean difference value of the first intermediate point is greater than mean difference value of the new current search point;

(c4c2) if the mean difference value of the first intermediate point is greater than the mean difference value of the new current search point, selecting the first intermediate point as a second new current search point;

(c4c3) if the mean difference value of the first intermediate point is greater than the mean difference value of the new current search point, determining a first predetermined number of first search points disposed a first predetermined pixel distance from the second new current search point, wherein the first search points and the second new current search point form a first group of points;

(c4c4) if the mean difference value of the first intermediate point is greater than the mean difference value of the new current search point, determining respective mean difference values of the first search points; and (c4c5) if the mean difference value of the first intermediate point equals the mean difference value of the new current search point, selecting the motion vector point based on the mean difference values of the first group of points.

11. The method as claimed in claim 10, wherein operation (c4c5) comprises:

(c4c5a) determining if the mean difference value of the second new current search point is smaller that the mean difference values of the remaining first group of points;

(c4c5b) if the mean difference value of the second new current search point is smaller that the mean difference values of the remaining first group of points, determining a second predetermined number of second search points disposed a second predetermined pixel distance from the second new current search point, wherein the second search points and the second new current search point form a second group of points;

(c4c5c) if the mean difference value of the second new current search point is smaller that the mean difference values of the remaining first group of points, determining respective mean difference values of the second search points; and (c4c5d) if the mean difference value of the second new current search point is smaller that the mean difference values of the remaining first group of points, selecting the motion vector point from among the second group of points, wherein the motion vector point has a smallest mean difference value of the second group of points.

12. The method as claimed in claim 10, wherein operation (c4c5) comprises:

(c4c5a) determining if the mean difference value of the second new current search point is smaller that the mean difference values of the remaining first group of points;

(c4c5b) if the mean difference value of the second new current search point is not smaller that the mean difference values of the remaining first group of points, selecting a selected point of the first group of points, wherein the selected point has a mean difference value smaller than the remaining first group of points;

(c4c5c) if the mean difference value of the second new current search point is not smaller that the mean difference values of the remaining first group of points, determining a third value based on a third predetermined relationship of the mean difference value of the selected point and the mean difference value of a third neighboring search point;

(c4c5d) if the mean difference value of the second new current search point is not smaller that the mean difference values of the remaining first group of points, determining a fourth value based on a fourth predetermined relationship of the mean difference value of the selected point and the mean difference value of a third neighboring search point; and (c4c5e) if the mean difference value of the second new current search point is not smaller that the mean difference values of the remaining first group of points, performing motion estimation based on a second correlation between the third value and the fourth value.

13. The method as claimed in claim 8, wherein the operation (c4c) comprises:
- (c4c1) determining if the mean difference value of the first intermediate point is greater than mean difference value of the new current search point;
- (c4c2) if the mean difference value of the first intermediate point is not greater than the mean difference value of the new current search point, determining a first predetermined number of first search points disposed a first predetermined pixel distance from the new current search point, wherein the first search points and the new current search point form a first group of points;
- (c4c4) if the mean difference value of the first intermediate point is not greater than the mean difference value of the new current search point, determining respective mean difference values of the first search points; and
- (c4c5) if the mean difference value of the first intermediate point is not greater than the mean difference value of the new current search point, selecting the motion vector point based on the mean difference values of the first group of points.

14. The method as claimed in claim 13, wherein operation (c4c5) comprises:
- (c4c5a) determining if the mean difference value of the new current search point is smaller that the mean difference values of the remaining first group of points;
- (c4c5b) if the mean difference value of the new current search point is smaller that the mean difference values of the remaining first group of points, determining a second predetermined number of second search points disposed a second predetermined pixel distance from the new current search point, wherein the second search points and the new current search point form a second group of points;
- (c4c5c) if the mean difference value of the new current search point is smaller that the mean difference values of the remaining first group of points, determining respective mean difference values of the second search points; and
- (c4c5d) if the mean difference value of the new current search point is smaller that the mean difference values of the remaining first group of points, selecting the motion vector point from among the second group of points, wherein the motion vector point has a smallest mean difference value of the second group of points.

15. The method as claimed in claim 13, wherein operation (c4c5) comprises:
- (c4c5a) determining if the mean difference value of the new current search point is smaller that the mean difference values of the remaining first group of points;
- (c4c5b) if the mean difference value of the new current search point is not smaller that the mean difference values of the remaining first group of points, selecting a selected point of the first group of points, wherein the selected point has a mean difference value smaller than the remaining first group of points;
- (c4c5c) if the mean difference value of the new current search point is not smaller that the mean difference values of the remaining first group of points, determining a third value based on a third predetermined relationship of the mean difference value of the selected point and the mean difference value of a third neighboring search point;
- (c4c5d) if the mean difference value of the new current search point is not smaller that the mean difference values of the remaining first group of points, determining a fourth value based on a fourth predetermined relationship of the mean difference value of the selected point and the mean difference value of a fourth neighboring search point; and
- (c4c5e) if the mean difference value of the new current search point is not smaller that the mean difference values of the remaining first group of points, performing motion estimation based on a second correlation between the third value and the fourth value.

16. The method as claimed in claim 1, wherein operation (c4) comprises:
- (c4a) determining if the first value is greater than the second value;
- (c4b) if the first value is not greater than the second value, determining a first intermediate point between the new current search point and the first neighboring point; and
- (c4c) if the first value is not greater than the second value, determining a mean difference value for the first intermediate point.

17. The method as claimed in claim 16, wherein operation (c4b) comprises:
- (c4b1) if the first value is greater than the second value, determining a first intermediate point between the new current search point and the second neighboring point.

18. Software contained in a computer readable medium comprising instructions to instruct a processor to perform a routine comprising:
- (a) calculating respective mean difference values for a current search point of a search block and neighboring search points within the search block;
- (b) performing motion estimation around the current search point if the mean difference value of the current search point is smaller than the mean difference values of the neighboring search points; and
- (c) performing motion estimation based on the mean difference values of at least some of the neighboring search points if the mean difference value of the current search point is not smaller than the mean difference values of at least one the neighboring search points, wherein the operation (c) comprises:
  - (c1) selecting a new current search point from among said neighboring search points, wherein said new current search point has a smallest mean difference value of the neighboring search points;
  - (c2) determining a first value based on a first predetermined relationship of the mean difference value of the new current search point and the mean difference value of a first neighboring search point;
  - (c3) determining a second value based on a second predetermined relationship of the mean difference value of the new current search point and the mean difference value of a second neighboring search point; and
  - (c4) performing motion estimation based on a first correlation between the first value and the second value.

19. The software as claimed in claim 18, wherein the first predetermined relationship is an absolute difference between the mean difference value of the new current search point and the mean difference value of the first neighboring search point, and
  wherein the second predetermined relationship is an absolute difference between the mean difference value of the new current search point and the mean difference value of the second neighboring search point.

20. The software as claimed in claim 19, wherein the mean difference values are mean absolute difference values.

21. The software as claimed in claim 19, wherein the mean difference values are mean square difference values.

22. The software as claimed in claim 18, wherein the mean difference values are mean absolute difference values.

23. The software as claimed in claim 18, wherein the mean difference values are mean square difference values.

24. The software as claimed in claim 18, wherein operation (c4) comprises:
(c4a) determining if the first value equals the second value;
(c4b) if the first value equals the second value, determining a first predetermined number of first search points disposed a first predetermined pixel distance from the new current search point, wherein said first search points and the new current search point form a first group of points; and
(c4c) if the first value equals the second value, determining respective mean difference values of the first search points; and
(c4d) if the first value equals the second value, selecting the motion vector point from among the first group of points, wherein the motion vector point has a smallest mean difference value of the first group of points.

25. The software as claimed in claim 18, wherein operation (c4) comprises:
(c4a) determining if the first value is greater than the second value;
(c4b) if the first value is greater than the second value, determining a first intermediate point between the new current search point and the second neighboring point; and
(c4c) if the first value is greater than the second value, determining a mean difference value for the first intermediate point.

26. The software as claimed in claim 25, wherein the operation (c4c) comprises:
(c4c1) determining if the mean difference value of the first intermediate point equals the mean difference value of the new current search point;
(c4c2) if the mean difference value of the first intermediate point equals the mean difference value of the new current search point, determining a second intermediate point between the first intermediate point and the new current search point;
(c4c3) if the mean difference value of the first intermediate point equals the mean difference value of the new current search point, determining a first predetermined number of first search points disposed a first predetermined pixel distance from the second intermediate point, wherein the first search points and the second intermediate point form a first group of points;
(c4c4) if the mean difference value of the first intermediate point equals the mean difference value of the new current search point, determining respective mean difference values of the first search points; and
(c4c5) if the mean difference value of the first intermediate point equals the mean difference value of the new current search point, selecting the motion vector point from among the first group of points, wherein the motion vector point has a smallest mean difference value of the first group of points.

27. The software as claimed in claim 25, wherein the operation (c4c) comprises:
(c4c1) determining if the mean difference value of the first intermediate point is greater than mean difference value of the new current search point;
(c4c2) if the mean difference value of the first intermediate point is greater than the mean difference value of the new current search point, selecting the first intermediate point as a second new current search point;
(c4c3) if the mean difference value of the first intermediate point is greater than the mean difference value of the new current search point, determining a first predetermined number of first search points disposed a first predetermined pixel distance from the second new current search point, wherein the first search points and the second new current search point form a first group of points;
(c4c4) if the mean difference value of the first intermediate point is greater than the mean difference value of the new current search point, determining respective mean difference values of the first search points; and
(c4c5) if the mean difference value of the first intermediate point equals the mean difference value of the new current search point, selecting the motion vector point based on the mean difference values of the first group of points.

28. The software as claimed in claim 27, wherein operation (c4c5) comprises:
(c4c5a) determining if the mean difference value of the second new current search point is smaller that the mean difference values of the remaining first group of points;
(c4c5b) if the mean difference value of the second new current search point is smaller that the mean difference values of the remaining first group of points, determining a second predetermined number of second search points disposed a second predetermined pixel distance from the second new current search point, wherein the second search points and the second new current search point form a second group of points;
(c4c5c) if the mean difference value of the second new current search point is smaller that the mean difference values of the remaining first group of points, determining respective mean difference values of the second search points; and
(c4c5d) if the mean difference value of the second new current search point is smaller that the mean difference values of the remaining first group of points, selecting the motion vector point from among the second group of points, wherein the motion vector point has a smallest mean difference value of the second group of points.

29. The software as claimed in claim 27, wherein operation (c4c5) comprises:
(c4c5a) determining if the mean difference value of the second new current search point is smaller that the mean difference values of the remaining first group of points;
(c4c5b) if the mean difference value of the second new current search point is not smaller that the mean difference values of the remaining first group of points, selecting a selected point of the first group of points, wherein the selected point has a mean difference value smaller than the remaining first group of points;
(c4c5c) if the mean difference value of the second new current search point is not smaller that the mean difference values of the remaining first group of points, determining a third value based on a third predetermined relationship of the mean difference value of the selected point and the mean difference value of a third neighboring search point;

(c4c5d) if the mean difference value of the second new current search point is not smaller that the mean difference values of the remaining first group of points, determining a fourth value based on a fourth predetermined relationship of the mean difference value of the selected point and the mean difference value of a third neighboring search point; and (c4c5e) if the mean difference value of the second new current search point is not smaller that the mean difference values of the remaining first group of points, performing motion estimation based on a second correlation between the third value and the fourth value.

30. The software as claimed in claim 25, wherein the operation (c4c) comprises:

(c4c1) determining if the mean difference value of the first intermediate point is greater than mean difference value of the new current search point;

(c4c2) if the mean difference value of the first intermediate point is not greater than the mean difference value of the new current search point, determining a first predetermined number of first search points disposed a first predetermined pixel distance from the new current search point, wherein the first search points and the new current search point form a first group of points;

(c4c4) if the mean difference value of the first intermediate point is not greater than the mean difference value of the new current search point, determining respective mean difference values of the first search points; and (c4c5) if the mean difference value of the first intermediate point is not greater than the mean difference value of the new current search point, selecting the motion vector point based on the mean difference values of the first group of points.

31. The software as claimed in claim 30, wherein operation (c4c5) comprises:

(c4c5a) determining if the mean difference value of the new current search point is smaller that the mean difference values of the remaining first group of points;

(c4c5b) if the mean difference value of the new current search point is smaller that the mean difference values of the remaining first group of points, determining a second predetermined number of second search points disposed a second predetermined pixel distance from the new current search point, wherein the second search points and the new current search point form a second group of points;

(c4c5c) if the mean difference value of the new current search point is smaller that the mean difference values of the remaining first group of points, determining respective mean difference values of the second search points; and (c4c5d) if the mean difference value of the new current search point is smaller that the mean difference values of the remaining first group of points, selecting the motion vector point from among the second group of points, wherein the motion vector point has a smallest mean difference value of the second group of points.

32. The software as claimed in claim 30, wherein operation (c4c5) comprises:

(c4c5a) determining if the mean difference value of the new current search point is smaller that the mean difference values of the remaining first group of points;

(c4c5b) if the mean difference value of the new current search point is not smaller that the mean difference values of the remaining first group of points, selecting a selected point of the first group of points, wherein the selected point has a mean difference value smaller than the remaining first group of points;

(c4c5c) if the mean difference value of the new current search point is not smaller that the mean difference values of the remaining first group of points, determining a third value based on a third predetermined relationship of the mean difference value of the selected point and the mean difference value of a third neighboring search point;

(c4c5d) if the mean difference value of the new current search point is not smaller that the mean difference values of the remaining first group of points, determining a fourth value based on a fourth predetermined relationship of the mean difference value of the selected point and the mean difference value of a fourth neighboring search point; and (c4c5e) if the mean difference value of the new current search point is not smaller that the mean difference values of the remaining first group of points, performing motion estimation based on a second correlation between the third value and the fourth value.

33. The software as claimed in claim 18, wherein operation (c4) comprises:

(c4a) determining if the first value is greater than the second value;

(c4b) if the first value is not greater than the second value, determining a first intermediate point between the new current search point and the first neighboring point; and (c4c) if the first value is not greater than the second value, determining a mean difference value for the first intermediate point.

34. The software as claimed in claim 33, wherein operation (c4b) comprises:

(c4b1) if the first value is greater than the second value, determining a first intermediate point between the new current search point and the second neighboring point.

* * * * *